June 2, 1931.  G. G. EARL  1,808,209
FLUID METERING SYSTEM AND APPARATUS
Filed Dec. 21, 1923   3 Sheets-Sheet 1
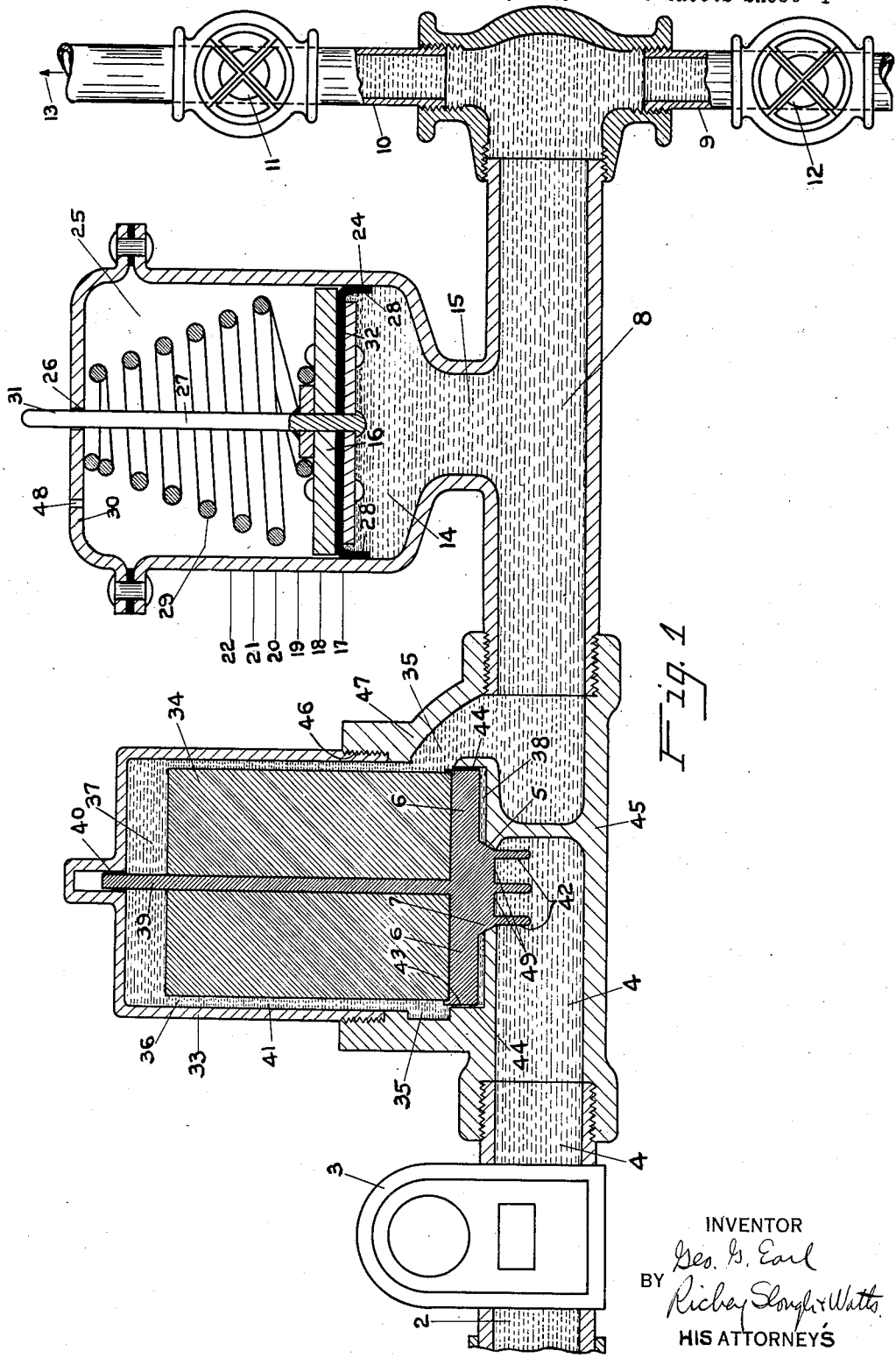

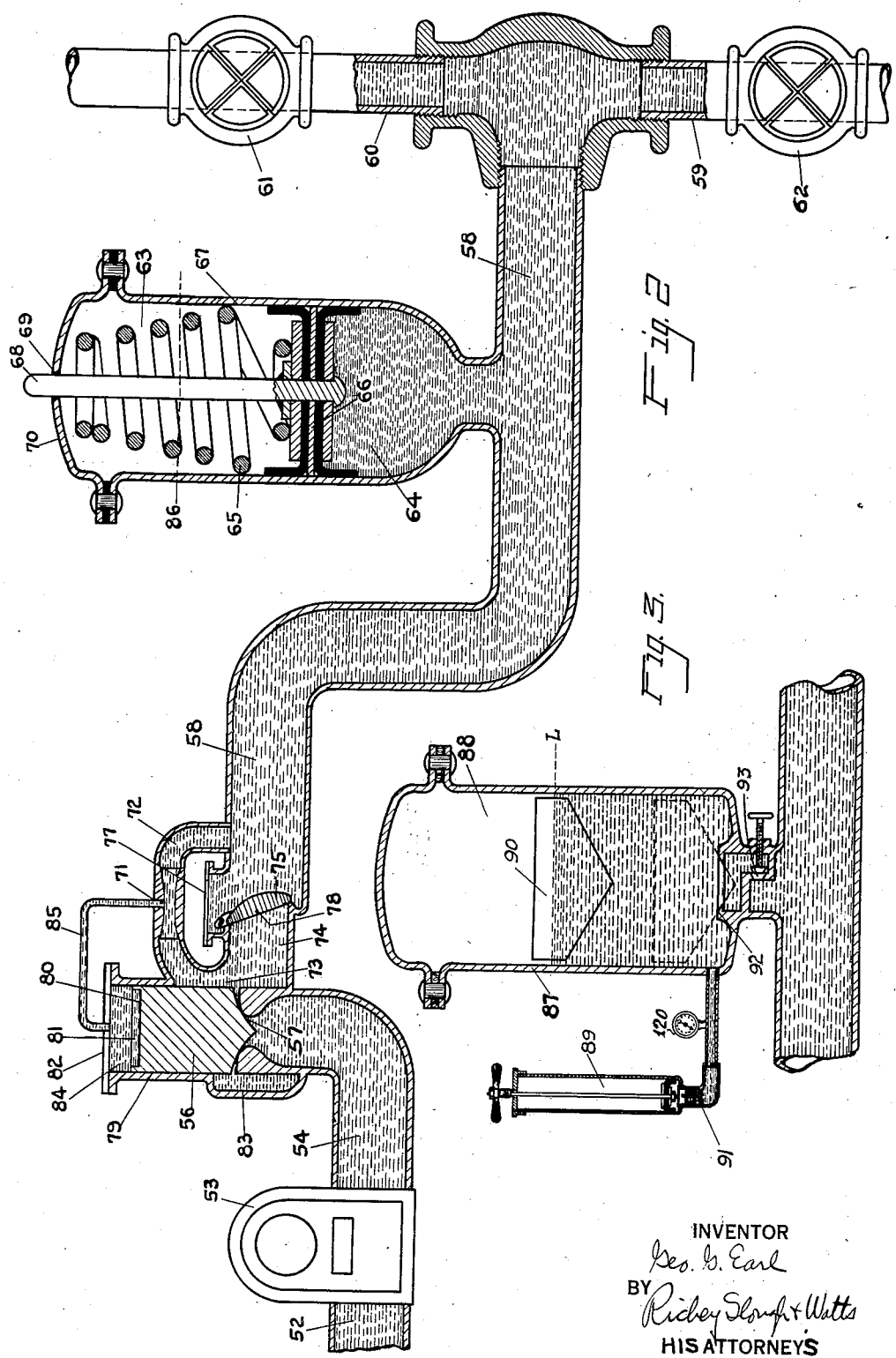

June 2, 1931.  G. G. EARL  1,808,209
FLUID METERING SYSTEM AND APPARATUS
Filed Dec. 21, 1923   3 Sheets-Sheet 3

INVENTOR
Geo. G. Earl
BY Richey Slough + Watt,
HIS ATTORNEYS

Patented June 2, 1931

1,808,209

UNITED STATES PATENT OFFICE

GEORGE GOODELL EARL, OF NEW ORLEANS, LOUISIANA

FLUID METERING SYSTEM AND APPARATUS

Application filed December 21, 1923. Serial No. 682,040.

My invention relates to fluid metering systems and apparatus and is applicable to fluid supply systems and apparatus as may be employed in connection with the metering of fluid flow as supplied to residences, or other points where fluid is taken from a fluid supply system. It has been found with all commercial types of fluid meters with which I am familiar that such meters only register, with any satisfactory degree of accuracy, flows of a fluid such as water, where such flows are passing at above a predetermined minimum rate through the meter.

Particularly in water supply systems this is very unsatisfactory, since at water consuming points such as residences there is often and quite commonly, a continual flow of water through such meters at a relatively low rate, and commonly either such flows are entirely unregistered or registered at only a fraction of the flow values actually taking place. It is found that as the sizes of such meters, referring to their water passing capacity at the system pressure, increases, that the value of the minimum flow of water, approximately accurately registerable, increases so that whereas a meter of one of the smaller sizes such as is usually connected in a 5/8" pipe line such meter only registers water passing through it at the rate of one or more gallons per minute to a degree of accuracy of 2% of actual flow and when the flow is decreased to a rate as low as 1/4 gallon per minute such a meter is only liable to register within 10% of accuracy, that is it may register only about 90% only of the actual flow passing through it.

Also a larger meter such as one which may be connected in a 6" pipe line, and known as a 6" meter, will be required to pass something like 48 gallons per minute in order for the meter to register within say, 2% of the actual flow values, and the same meter when passing only 12 gallons per minute may register only say, 90% of such actual flow values which with smaller flows are only partially registered or are entirely unregistered. For other sizes of meters, generally the values above given vary proportionately.

Efforts have been made in cases where large flows are to be metered to compound a small and a large sized meter called respectively a "displacement" and a "current" meter, the same being placed in branches of the water supply main in order that the smaller meter may register more efficiently the smaller flows and the larger meter being employed to register the larger flows, the compound metering system thus provided having mechanism associated therewith whereby when the flow is wholly or mainly on one of the meters, the flow through the other meter will be automatically wholly or in part out at a "change-over" rate value.

However, with such arrangements, it is found that at different rates of flow extending over a range of rates, including the "change-over" rate point the accuracy of registering is decreased very materially; and over a considerable range, therefore, in the compounded system, the registered flows are not accurately indicative of the actual flows.

Although other systems and apparatus, therefore, have been proposed with the aim to more accurately register the fluid flows at different rates of fluid flow, so far as I am aware no prior commercial system or combination of apparatus has been devised which will register with a satisfactory degree of accuracy, the actual flow passing through the meter, at all possible rates.

An object, therefore, of my present invention is to provide a fluid metering system and apparatus, comprising fluid flow registering mechanism which will register to a higher degree of accuracy, such as within 2% of actual flow plus or minus, the values of all water which actually flows through the meter.

Another object of my invention is to provide such a system and apparatus wherein standard types of meters may be employed in combination with a minimum amount of controlling means to insure accuracy in the registering of flows by the meter.

Another object of my invention is to provide approved apparatus operable in the system of my invention to accomplish the results sought in a highly satisfactory manner.

Another object of my invention is to provide a system adapted to supply water to the system at varying rates as may be required by the needs of the system including leakages in the system, and to pass all of such supplied water through the meter only at a sufficiently rapid rate that accuracy of registering may be secured.

Such and other objects of my invention and the invention itself will be clear by reference to the following description of a specific embodiment of my invention and in which description reference will be had to the accompanying drawings forming a part of this specification.

In the drawings—

Fig. 1 is a view, largely in longitudinal cross-section of a system embodying my invention. In this view the parts are not shown, necessarily, in preferably proportional sizes, and in part the view is diagrammatic of the actual apparatus employed.

Fig. 2 is a similar view of a similar system which is a second embodiment of my invention in which the valve comprising one of the elements thereof has an additional controlling means not shown in the embodiment of Fig. 1.

Fig. 3 shows a modified form of pressure chamber which I may sometimes employ in systems of my invention.

Figure 4:
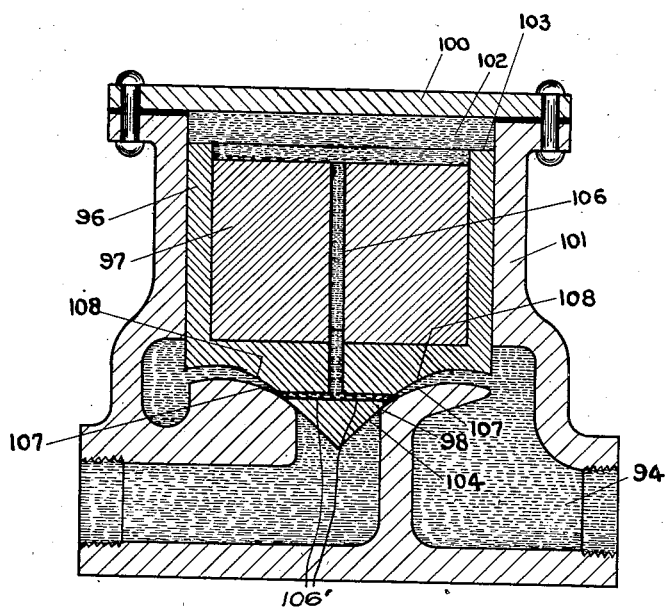
Fig. 4 shows apparatus which may be used in a system of my invention, and whose operation is similar to that illustrated in Fig. 2, the form of the apparatus being varied, however.

Referring now first to the system of Fig. 1 at 2 I show a source of fluid supply such as a water main in which a fluid such as water is contained and may be supplied under pressure; at 3 I show a water meter which may be of any one of a number of different types commonly in use, it being proposed to supply water from the main 2 through the meter 3 to a residence branch of the water main 2 for the purpose of measuring the amount of the water discharged through such branch. At 4 I show a conduit leading from the water meter to an automatically operable valve mechanism having a valve seat 5 and a valve 6 adapted to engage in a contact portion 7, with the valve seat 5, which seat is preferably circular; the portion 7 of the valve member 6 is likewise circular and preferably tapered so as to make a good fit with the seat when the valve member is so moved, as to close the valve.

A conduit 8 leads from the discharge end of the valve mechanism to supply pipes such as 9 and 10, of the residence or other water consuming station, and which may have fluid flow controlling valves such as ordinary manually operated valves as shown at 11 and 12 to control the withdrawal of the water through such pipes. In the following description we will herein later at times assume that the valve 11, due to a fault in the valve, or an improper closing of the valve, permits a small flow of water to pass through it and to be discharged from the system as indicated by the arrow at 13. This flow will be termed herein as a "leak" although its cause may be accidental, or intentional, or due to carelessness; the rate of the flow due to such leak alone is assumed to be so low that if the flow is permitted to pass freely through the water meter 3, the water meter either would not register the amount of such flow at all or would do so very inefficiently, and only a fraction of the flow due to such leak might be registered.

Also the assumption will be made that the water containing system is full of water, that is, the main 2 contains a source of water under pressure adapted to pass through the water meter 3 and at all times filling the conduit 4, the conduit 8 and the storage chamber 14. The storage chamber 14 communicates by an opening 15 with the conduit 8, and is of variable volume, depending on the position of a spring pressed piston 16, which, in the embodiment illustrated, forms one movable wall of the storage chamber 14.

The piston 16 may take any position between the points 17 and 22, such as the points 18, 19, 20, and 21 depending upon the pressure of water contained in the storage chamber 14. On the opposite side of the piston a pressure chamber 25 is provided having an opening 26 through which the piston rod 27 may pass and be guided, the piston being maintained thereby in proper axial alignment with the cylinder as it rises and falls therein to prevent tipping and consequently locking or partially locking the piston.

As the pressure in the storage chamber 14 increases the piston 16 will be forced upwardly and effect the compression of the coiled spring 29 in the pressure chamber positioned between the top wall 30 and the upper surface of the piston 16. The protruding end 31 of the rod 27 serves as a visible indication on the outside of the cylinder 25, of the pressure exerted in the storage chamber 14 at any time, and also enables a count to be noted of the number of reciprocations accomplished by the piston 16 as later described. The sealing cup 32 having the sealing flange 28 effects a good liquid seal between the cylindrical walls of the casing and the piston 16.

Referring now to the automatic valve mechanism, in the embodiment illustrated in Fig. 1, this valve mechanism is shown as comprising a casing 33 and a movable valve 6. The weight of the valve 6 opposes the pressure of the fluid in the conduit 4 and is reinforced in such opposition by a superposed weighted portion 34 which in the embodiment illustrated may be of a weight of say, 3½# which is carried on the valve 6, and which tends to maintain the valve opening closed to prevent the flow of fluid from the conduit 4 to the conduit 8 through such opening. Pressure opposing the pressure of fluid in the conduit 4 is likewise derived from the conduit 8 through channels 35 and 36 extending upwardly around the portion 34 and will be exerted upon the top wall of the weighted valve 6. A border portion of the bottom wall of the valve 6 is exposed likewise to the pressure from the source 8 and the pressure so exerted on such border portion of the valve will balance a portion of the pressure exerted on the top wall of the weighted valve as described. The weighted valve may be provided with a guide rod 39 extending in an aligning recess 40, whereby the valve is maintained in proper axial alignment. I also preferably provide an aligning extension portion 42 for the valve 6 and depending therefrom, passing through the valve opening and engaging the inner walls thereof. The walls 44 and the valve seat 5 are preferably formed in the pipe coupling 45 in which the valve mechanism described is preferably mounted.

In the valve construction above described, the upper portion of the casing 33 is screw threaded at 46 to the lower coupling portion 47.

Now when the system described is in operation, assuming, first, that a condition exists in the system wherein the pressure in the conduit 4 may exceed the pressure in the conduit 8 but slightly, and also the valve 6 will, by the effort of the weight 34 hold the valve 6 on its seat 5 to maintain the valve closed to prevent all flow from the conduit 4 to the conduit 8, though in fact under such conditions as so far assumed, there would be little or no tendency for such flow. The pressure in the conduit 8, exerted against the bottom of the piston 16, will have forced such piston upward, until the piston compresses the spring 29 to a degree wherein the counter pressure exerted by this spring plus the counter pressure due to weight of the lifted parts, is equal to the pressure of the water in the storage chamber 14 below it. The water pressure and the spring and weight pressure being at such time in equipoise, the piston 16 is positioned in an upper portion of the casing, the position being determined by the amount of force exerted by the water pressure, and we will assume, for example, that this position is one wherein the lower surface of the piston portions 28, will be at such a level as marked 22 in the figure. In addition to the pressure of the spring 29 only atmospheric pressure and the weight of the parts is exerted, in the embodiment now being described, on the upper side of the piston 16. An opening 48 in the top wall 30 of the pressure chamber 25 permits air to be forced therefrom when the piston is rising and to again re-enter the space above the piston when the piston is falling.

Now assuming that the valve 11 is permitted to pass a small flow of water such as a leakage flow in a direction as indicated by the arrow at 13 from the conduit 10, but insufficient to continuously operate the meter 3 to accurately register such flow, if such a flow were to continuously pass such meter. Under such a condition, at first the piston 16 will start to move downwardly from the position as assumed and indicated at 22, until when the pressure in the conduit 8 has fallen below a predetermined pressure value and which is accompanied by a change in the position of the piston 16, which may now achieve a position such as shown at 18 as illustrated in Fig. 1. At such time the pressure in the conduit 8 will be considerably lower than the pressure in the conduit 4 and due to the excess of pressure in the conduit 4, such excess of pressure will be operative to cause water to press against that lower surface 49 of the valve 6 extending within the opening provided by the valve seat 5, and when the excess of pressure thus operative on the surface 49 exerts a sufficient force upward against such surface, a lifting of the weighted valve 6 will result and the valve 6 will be lifted from the stationary seat 5, and water will flow from the conduit 4 through the valve opening and through the channel 38, and between the valve 6 and the bounding walls 44 into the passage-way 35, communicating directly with the conduit 8 on the discharge side of the valve.

Water will, therefore, be communicated through the valve from conduit 4 to conduit 8 and will restore the depleted pressure in such conduit 8 and in the storage chamber 14 below the piston 16, and the piston 16 will be restored against the power of the spring until it reaches a balanced pressure position such as the level 22. Then there will have been restored near equality of pressure on the two sides of the valve 6, which, being pressed downwardly by its weight, in the embodiment illustrated herein assumed to be 3½# will again close the valve port, cutting off the supply of water therethrough.

In accomplishing the replenishment of pressure in the conduit 8 and lifting the piston 16, a certain amount of water was passed by the valve mechanism from conduit 4 and this amount of water was passed through the water meter 3 at a sufficiently high rate to efficiently operate the water meter 3. The system continues then in operation as described, as long as the leak such as through the valve 11 continues, the piston 16 being gradually lowered again, forcing water through the leak until the pressure in the conduit 8 again reaches a predetermined low value, when the valve will function responsive to the low value of pressure in the conduit 8, relative to the value of pressure in the conduit 4 to again pass a surge of water through the valve, to recharge the storage chamber 14 and the conduit 8 with water under pressure. The storage chamber 14 thus stores water under pressure, which may be drawn therefrom during relatively long periods of time between valve operations, and the valve operates as a controller to shut off water through the meter during portions of such periods of low demand for water where the demand is insufficient to accurately operate the water meter, and the continuous low demand is supplied from the storage chamber, which is rapidly replenished with metered water at a relatively high rate of flow.

The valve 6 herein is shown as normally pressed downwardly by a weight such as herein shown at 34, but other means not shown but well understood in this art may be employed for supplying a biasing pressure being so related, however, to the fluid pressure from the conduit 4 required to open the valve against such biasing pressure, that the valve will open only upon a relatively considerable difference of pressure in the conduits 4 and 8, and will close only when the values of pressure in the conduits 4 and 8 differ only by approximately the pressure exerted on the valve by its weight, or by the force of whatever biasing means is used.

In order to carry out this fundamental idea, I so shape the surfaces of the channels and passages and so arrange them as will best predetermine the pressure conditions and range of pressures over which my valve is intended to operate; in line with such intention, I may as herein shown, make the distance between the peripheral edge 43 of the valve 6 and the wall 44 outside such edge very small, as for instance, it might be only a few thousandths of an inch so that when the valve 6 is lifted by the proper excess of pressure in the conduit 4 over that in the conduit 8, that immediately the valve is opened between the seats 5 and 7, pressure will be communicated to the space 38 above and surrounding such opening and excess of pressure on the approach side of the valve port will be distributed over a larger area of the bottom wall of the valve 6, and the valve will be lifted with greater power and positiveness, until it reaches a position wherein the border of the bottom portion of the valve 6 is projected to the level of the annular channel 35, to a greater or less degree.

Now assuming that in the system of Fig. 1 the consumer suddenly operates one of the valves 11 and 12 to cause a greater discharge of water, such a discharge of water, for instance, that flows at a rate which is great enough that when passed directly through the meter, it will be registered with a sufficient degree of accuracy, the piston 16 will first rapidly descend according to the rate of discharge flow and the valve 6 will be quickly lifted due to the required difference in pressure between the conduits 4 and 8 to operate the valve being achieved, and the valve will be maintained in open position, permitting a flow of water directly from the main 2 through the water meter and the valve opening to the conduit 8 wherefrom it is distributed to the discharge pipe 9 or 10, such flow being continuous through the water meter and valve. The piston 16 above the pressure storage chamber 25 will be maintained lifted to such level as is commensurate with the value of fluid pressure existing in the storage chamber.

The relation between the minimum rate of flow through the meter mechanism 3 which will be registered with sufficient accuracy by such mechanism, and the pressure relations necessary incidental to maintaining the valve 6 in open position, is such that the valve 6 will return to closed position whenever the flow passing through the valve is restored to such minimum rate of flow. The valve opening provided by upward movement of the valve 6 resists flow passed through it sufficiently that a reduction in pressure is had in the chamber 35 on the discharge side of the valve relative to the pressure exerted on the under side of the valve 6, so long as a sufficient rate of flow continues, this excess of pressure on the under side of the valve being sufficient to overcome the weight of the weighted valve, and therefore such a weighted valve is held in an upper open position so long as the rate of flow through the valve is accomplished at a sufficiently high rate. When this predetermined rate is reduced, the valve will return to its seat by the force of gravity.

Also when such relatively high rate of flow is discontinued, a substantial equality of pressures in the conduits 4 and 8 is quickly approached and the piston 16 is raised to a degree commensurate with the value of pressure in the system under no-flow conditions, which position may be that indicated at 22, and the valve will again close as before described.

Referring now to the system shown in Fig. 2 which illustrates also largely diagrammatically, a system which is a second embodiment of my invention, I show the water meter at 53, the water main at 52 and a duct leading from the water meter at 54. At 56 I show a weighted movable valve having a seat at 57 and at 58 I show a discharge duct leading from the valve to the supply pipes 59 and 60, each shown as having manually operable valves as 61 and 62 controlling the flow from the said supply pipes. At 63 I show a pressure chamber for the same purpose and operating in like manner to the chamber 25 of Fig. 1 and having as shown a piston 66 mounted to reciprocate within the cylindrical walls 67 of the chamber 63 and having a spring 65 tending to force the piston 66 downward against the pressure of the water or other fluid contained in the storage chamber 64 below the piston, while a rod 68 extends from the piston 66 through an opening 69 in the top wall 70 of the chamber 63 and serves to maintain the piston in alignment.

At 71 I show a venturi located in a duct 72 extending between the passage 73 on the discharge side of the valve port 57 and at 74 I show a second duct located in a branch of the path of flow between the passage 73 and the duct 58, said branch duct 74 containing a weighted check valve 75.

When flow occurs through the venturi, according to the well known properties of venturis, the pressure exerted by the past flow is reduced in value below that pressure existing in such a passage as that shown at 73 on its approach side. When flow occurs through the port 57 and is passed through the venturi by virtue of the duct 85 communicating the reduced velocity pressure of fluid from the throat of the venturi to the space 84 above the valve 56, and the valve 56 being in its elevated port opening position, its lower surface will be disclosed to the increased velocity pressure effect existing in the passage 73 and its top surface will be relatively reducing the pressure effect communicated from the Venturi throat and such differences of pressure existing between the approach 2 and the throat of the venturi will be commensurable to the weight of flow through the venturi.

The check valve resists the flow through the branch duct 74 until a predetermined difference of pressure on its two sides is created. Thereafter this valve acts to maintain a sufficient drop of pressure across itself to cause a sufficient flow to be effected through the branch passage 72.

The function of this apparatus disposed intermediate the conduit 54 and duct 58 is to hold open the valve 56 in opposition to its weight at a definite difference of pressure on its two sides and to drop it at a substantially lower rate of flow through the passage 72. The function of the check valve is to force the whole flow through 72 at and near the critical stage of flow, and enough to sustain the valve 56 in a wide open position at rates above a critical rate of flow, at the same time avoiding any more resistance to larger flows than is necessary to accomplish these ends. The exact construction of the check valve is not essential in the practice of my invention. Various known types of spring closed and/or gravity closed check valves on otherwise disposed valve seats may be employed instead of the swinging type illustrated, the desirable result in any case being to produce as nearly constant resistance to flow as possible. Thus I have provided between the passage 73 on the discharge side of the valve 56—57 and the conduit 58, a pair of branch paths for fluid flow, the one part containing the venturi 71 and the other containing the check valve 75, the Venturi path always being open to fluid flow between the chamber and the conduit, but the other path being normally closed by the check valve and opened only upon a predetermined fluid pressure, due to fluid flow passing through it.

In this embodiment of my invention, I make a relatively close fluid tight fit between the valve 56 and the cylindrical walls 79 within which the said valve is vertically reciprocable and I preferably provide a shallow recess 80 in the upper face of the valve 56 surrounded by an up-standing annular flange 81, the same insuring that there be a space 84 between the top wall 82 of the casing and the top of the valve. It will be noted also that as in the preceding embodiment described, that when the valve 56 is closed the area of the bottom surface exposed to the excess of pressure in the conduit 54 is less than the area of the valve above the valve ports exposed to the reduced pressure existing on the discharge side of the valve.

Assuming now that all of the conduits, passages and containers intended to be filled with water during the operation of the system are full of water and that there is no discharge of water whatever through the conduits 60 and 59 and, therefore, through the conduits 58 and 54 and the water meter 53, the valve 56 will be closed as shown due to the near equality of water pressure in the conduits 58 and 54, the valve, due to its weight, being caused to rest upon the valve seat, closing the valve port 57. The check valve 75 will also be closed due to the equality of pressure on its two sides, due to the bridging Venturi duct 72.

As in the previously described system, the piston 66 in the pressure chamber 63 will be maintained lifted to some position such as the level 86. Whenever, therefore, a leak occurs in the system, such as through the valve 61 or due to any cause sufficient to cause a slight flow of fluid under pressure to pass from the conduit 60, the piston 66 will gradually be lowered being pressed downwardly by the pressure of the spring 65 until enough water has been drawn from the conduit 58 that the pressure in the conduit 58 is lowered to effect a predetermined difference in pressure between the water in the conduits 54 and 58. The excess of pressure in the conduit 54 exerts a lifting pressure upon the valve 56. When this lifting effort is sufficient to overcome the weight of the valve 56, it will rise, opening the valve 56—57 and causing an increased pressure on the approach sides of the venturi 71 and the check valve 75.

This increase of pressure will initially induce a rapid flow through both passageways, but since the check valve 75 is so weighted as to close at any given difference of pressure on its two sides and to be effective at all times to maintain substantially that same difference of pressure on its two sides, there will be the same difference of pressure on the two ends of the Venturi passage way 72 and a great reduction of pressure at the restriction 71, which reduced pressure will be communicated by the duct 85 to the upper surface of the valve 56, while the greater pressure of water at the approach passage 73 will be operative upon the under side of said valve. It is therefore easy to determine by the mathematics pertaining to the properties of fluid flow for any given weight and area of the valve 56, the sustaining or lifting power, resulting from a flow of water of any given velocity, through any given area of restriction 71 and so long as the velocity through 71 is enough to effect lifting or sustaining of the weight of the valve 56, it will continue to rise or to be sustained in its uppermost position. If therefore, the resistance to flow effected by the check valve 75 is such as to force the whole of the flow or substantially the whole of the flow through 72 before the rate of flow through the valve port 57 has decreased below that point at which the meter ceases to register accurately, the valve will be sustained in its uppermost position until such rate through the port 57 decreases to a predetermined lesser rate of flow below which the meter mechanism 53 may not be relied upon for accurate registration.

Upon closure of said valve due to failure of the maintenance of a sufficient difference of pressure on its upper and lower sides when the rate of flow through the port 57 all demands of flow at lesser rates are supplied directly from the reservoir capacity in the storage chamber 64, renewed periodically by gulps of flow through the port 57, under the control of the valve 56.

I prefer to have the valve 56 come to an actual seat around its periphery against the top of the space 84 and to so form the passage way 73 under the valve 56 as to effect a uniform decrease in velocity of flow as the water passes from the center toward the periphery of said valve, thereby recovering a large amount of velocity held back into pressure at a reduced velocity. This permits the use of relatively high velocities approaching the valve 56 and therefore of a smaller area of passage way to be closed by said valve and a smaller diameter and height of weight or amount, or other resistance without excessive loss of pressure through the system as a whole at high rates of discharge.

Referring now to Fig. 3, I show a different form of pressure chamber adapted to be employed in the systems of Figs. 1 and 2 in place of the chambers 25 and 63. This modification does not employ a piston, and water is shown, therefore, in the tank rising to a level such as the level L, air being contained in the counter-pressure space 88 above the level of water, said air being compressed as the level of the water is raised, and the compressed air exerting a counter-pressure against the water to tend to expel it from the tank and from the supply pipes of the system whenever a demand for water is made, and the controlling valves of the systems are closed.

In the embodiment reservoir of Fig. 3 a floating check valve is shown at 90 in the container 87, and air may be confined therein under initial pressure by forcing the same from a pump 89, through a valve 91, opened only during pumping, to create an initial air pressure in the tank above the level of the liquid which is slightly less than the minimum pressure of the liquid contained in the system; in this way I may accomplish satisfactory counter-pressure effects in a system employing a very small tank.

When the container 87 is supplying fluid to the supplied system, while the automatic valve is closed, the floating check valve 90 may come to its lowermost position wherein its lower surface will engage the seat 92, provided for the purpose of making sealed contact with such lower check surface, to prevent the escape of air. The floating check valve 90 will be carried by the liquid and remain on its surface at any higher level of liquid and therefore the function of the apparatus to supply flows at rates below those required to hold the automatic valve open will not be interfered with during intervals between such closing and the reopening of the said automatic valve. The reservoir capacity being replenished by "gulps" of flow through the meter at rates at which the meter 53 or the meter 3 in Figs. 2 and 1 respectively can accurately register them. The valves 91 and 92 can be sealed closed and by closing valve 93 and by operating the pump 89, or by otherwise supplying air under pressure through the valve 91, the air can be replenished to any desired pressure in the container according to the requirements, and the pressure indicated on a suitable pressure gauge 120 of known construction and which may be associated with the container in a manner well understood in this art.

In using the type of reservoir shown in Fig. 3, I find that in a system which I have operated in using such a reservoir, that when the air chamber is pumped up to about 35 pounds pressure, there will be about 24 pulsations or cycles of movement of the automatic valve and resulting "gulps" of water to the system, per gallon of water supplied upon a condition of slow leak at the supplied end of the system; this in a system having an air chamber about three inches in diameter and twelve inches high. In this connection it is to be pointed out that in the different figures the apparatus is not shown to scale, the relative sizes being not to scale, as for any particular system and usually, although I have shown the valves as being larger than the meter the reverse would be true, no attempt being made to show the relative sizes of the different parts.

I may dispense in some cases with the floating check valve 90 of Fig. 3 for the sake of simplicity, though the use of such a floating check valve is of material aid in cutting down the size of reservoir required since the employment of a relatively high air pressure above the level of the contained liquid contributes to this result, and the floating check valve will more positively prevent loss of air.

It will be understood also, that if the fluid to be metered is a gas which is itself compressible, that very often the amount of gas contained in the system being supplied between the outlets and the automatic valve will be adequate for the reservoir capacity required for the system and in such a gas supply system the apparatus would be arranged as in Figs. 1, 2 and 3, except that the reservoir such as that shown at 64, 88 or 14, would not be required. If the amount of gas contained in the system is inadequate for best results, then a small enlargement may be added to the supplied end of the system, consideration being had of the fact in such gas systems that gas being compressible, there will be a materially different amount of gas, by weight, at the two different pressures at which the automatic valve opens and closes.

Resiliently expansible containers or confined resiliently compressible means may be employed in my improved system, the expansible container or confined compressible means being capable of exerting pressure in the manner of the springs and compressed air disposed in the pressure chambers of the described embodiments. Such containers are represented by the containers 88, 64 and 14 of the drawings if these containers be considered as composed not of metal, as illustrated, but of expansible resilient material.

Referring now to Fig. 4, I show therein a modified form of valve, wherein the difference of pressure on the upper and lower faces of the valve 96 is accomplished by so forming the adjacent passage surfaces of the movable valve 96 and the opposite fixed walls, that the function of the venturi 71 is performed in a more compact structure, the restriction to the flow between the surfaces 107 and 108 accomplishing a reduction of pressure in the flow, such reduced pressure being communicated to the upper face of the valve 96 by a passage 106 having radial branches 106' at its lower end. The effect thereof upon the movement of the valve is much the same as in the embodiment in Fig. 3.

The reduced pressure due to the high velocity of flow through the valve, when opened, will be felt through the ducts 106' and 106 over the entire upper surface of the valve 96, whereas its lower surface will only feel this reduced pressure near the seat 98 and will get the full effect of increased pressure by impact in the central portion 104 of its area, and the rapidly increasing pressure effect due to the "recovery" effected at high velocities in portions nearer the periphery, the surfaces 107 and 108 being designed to provide the most effective conditions for uniform decrease in velocity and consequent increase in pressure from the seat 98 to the periphery of the weight 96 which the conditions otherwise will permit. Depending upon the relative diameter of the seat 98 and the periphery of the valve 96, at high velocities, the pressure around the periphery under the valve can be made much greater than the pressure acting near the seat 98 and much greater than that communicated from the most restricted part of the passage by passage 106, to the entire area of the upper portion of the valve.

Such a valve will open to create a definite velocity at the varying area of opening opposite the entrances to the ducts 106' and will continue to open so long as that velocity is exceeded, will start to close whenever the velocity is less than that amount and will close entirely when the difference between the pressure at 104 and the pressure at 94 ceases to be able to induce a flow which can attain that amount of velocity in the restricted portion of its path opposite the entrances to the ducts 106'.

Figure 5:
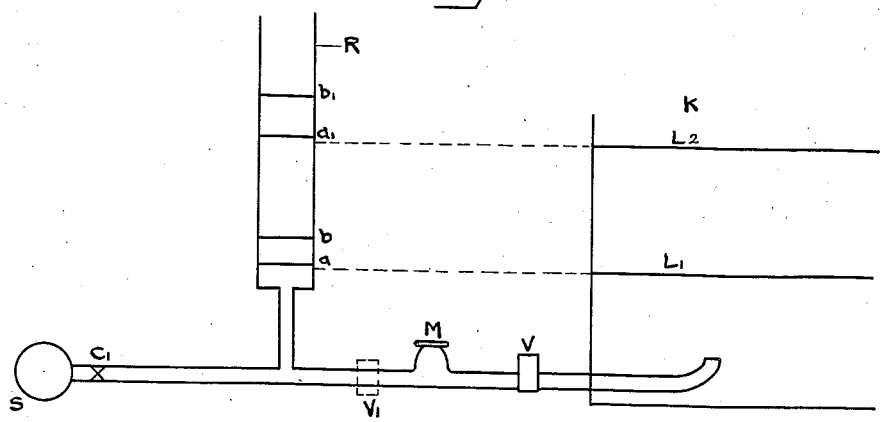
Fig. 5 shows another embodiment of my invention diagrammatically.

In Fig. 5 I show another embodiment of my invention. In the other figures, I have only considered cases of metering fluid flows when drawn from a system being supplied through valves or openings which control the flow from, or on, the side of the system which is being supplied. There are, however, other arrangements possible, and in considering my invention broadly, and in claiming the same broadly, consideration must be had of a case as shown in Fig. 5 wherein the arrangements are different.

Fig. 5 shows a system wherein water is supplied from a source to an outlet, the outlet of which may be a reservoir, or the system may comprise the supply of water from one system to another one or both having stand pipes, and under such conditions there are many cases where the reservoir capacity should or could be disposed on the approach side instead of the discharge side of the meter.

In the system of Fig. 5, the valve V may, for instance be of the type illustrated in Fig. 4 and responsive to effect a rapid flow or gulp of water therethrough upon an excess of pressure on its approach side, the varying pressures which may exist on the approach side of the valve being indicated by the stand pipe reservoir R, which may be open at its top as illustrated. The reservoir R may be closed at its top with confined air in the space above the water substantially as illustrated in the arrangement of Fig. 3 or may be provided with any other form of pressure chamber to reenforce the pressure exerted by the column of liquid on the approach side of the valve V. The meter M may be placed on the approach or discharge side of the valve in this embodiment and the stand pipe R may be placed in the system, as illustrated, on the approach or discharge side of the meter.

From the foregoing description it will be understood that the valve V will open whenever an excess of pressure indicated by the difference in levels $b$—$a$ exists on the approach side of the valve V over a pressure $L_1$ in the reservoir K, or assuming that the water in the reservoir is at a higher level $L_2$, the excess of pressure in the stand pipe necessary to effect opening of the valve V would be that indicated by the difference between the levels $b'$—$a'$. A valve $C_1$ may be disposed in the conduit on the approach side of the stand pipe to restrict the flow to any predetermined amount, the stand pipe R being of sufficient capacity and acquiring a sufficient head in excess of that reduced head of the reservoir K to effect operation of the valve and to supply "gulped" flow at a high rate through the meter to restore the approach to equalization of pressures in the stand pipe R and the reservoir K, necessary to restore the valve in line with the teachings of the foregoing embodiments and the conditions necessary to restore such a valve as shown in Fig. 4.

In any of the modifications above described a movable valve element such as 6, 56, or 96 may be biased to closed position by the action of gravity, or by a spring, or by other means all such means being comprehended by the biasing "means" of the claims.

Having thus described my invention in certain embodiments I am aware that numerous and extensive departures may be made from the embodiment herein illustrated and described but without departing from the spirit of my invention.

I claim:

1. In a fluid conduit system a fluid system valve having a movable member, the valve being normally biased toward closure by a given force, means for opening and holding open said valve at all rates of flow above a given rate of flow therethrough, and for closing said valve at any lower rate of flow, comprising means for conducting the fluid discharging through said valve through a restriction and means for communicating the pressure at the approach of said restriction to the movable member to cause it to tend to open the valve and means for communicating the reduced pressure effected by the restriction from the restriction to said movable member in opposition to the first named pressure.

2. In a fluid system, in combination a storage chamber, for containing fluid, a fluid consuming system communicating therewith, said chamber adapted to supply fluid upon demand to the consuming system, a source of supply of fluid under pressure, a conduit to communicate replenishing flows of fluid from the source to the chamber, a meter and a valve interposed in the conduit, said meter adapted to register the amount of replenishing fluid so supplied to the chamber, said valve positively moved to open position by the effect of a predetermined excess of static pressure on its side toward the source, over that existing on its discharge side, and means responsive to the velocity effects of fluid passing through the valve and acting directly thereon to effect a holding of the valve open to continuance of the flow therethrough so long as a given velocity is exceeded, independently of the relative static forces effective on its approach and discharge sides.

3. In a fluid system in combination a fluid storage reservoir, a fluid register and a valve serially disposed and joined to transmit fluid therethrough from a source of fluid at relatively high pressure to a fluid consuming point, said valve being movable to close in a direction counter to the direction of flow and directly responsive to a predetermined difference of pressure exerted upon its two sides to start and stop the flow through the register, means responsive to the rate of flow through the valve to effect the exertion of pressure effort upon the valve in excess of and opposing its tendency to close, and to effect a holding of the valve continuously in its opened position so long as a predetermined rate of flow is exceeded and biasing means opposing the effect of said rate of flow responsive means by a predetermined pressure value, said biasing means effecting closure of the valve against the direction of the flow upon reduction of the pressure effort effected by said rate of flow responsive means below a predetermined value when the flow is reduced to a predetermined lower rate.

4. In a fluid system a reservoir adapted to supply small drafts of flow at variable rates including low rates of flow, a valve, and a source of fluid at relatively high pressure adapted when the valve is opened to replenish the reservoir at only a rapid rate of flow, fluid flow registering mechanism interposed in the line of replenishing flow and responsive thereto, said reservoir having a pressure actuated wall reciprocable in a direction to force fluid therefrom upon demands therefor, and reciprocable in an opposite direction responsive to the greater pressure of fluid from the source when the valve is opened to permit storing of fluid in the reservoir during replenishing valve-opening periods, said reservoir comprising a counter-pressure means of inherent resiliency under compression, acting against said wall tending to move it in a direction to put the fluid in the reservoir under the reactive force effected by said counter-pressure means and means comprising a movable fluid division element adapted to communicate motion to said valve, a substantially Venturi restriction in a line of flow through said valve, and a duct communicating the pressure effects existing at the throat of the said venturi to a side of said division element to maintain the valve in opened position so long as a predetermined rate of flow through said venturi is exceeded.

5. In a fluid system, in combination a fluid storage reservoir, a fluid flow register and a valve serially disposed and joined to transmit fluid therethrough from a source of fluid at relatively high pressure to a fluid consuming point, means biasing said valve toward closed position and responsive to a predetermined difference of pressure on its two sides to start and stop the flow through the register, and means responsive to the rate of flow through the valve to exert an opening effort upon the valve in excess of and opposing its tendency to close, to hold it continuously in its opened position so long as a predetermined rate of flow is exceeded and to permit the valve to close at any lower rate, said last named means comprising a conduit for the flow of fluid through the valve having a restriction intermediate its ends, and means to communicate the reduced pressure of fluid effected by the constricting effect of the restricted conduit to those surfaces of the valve adapted to receive pressure tending to close the valve and other surfaces of the valve adapted to tend to open the valve when fluid pressure is directed against them, being simultaneously exposed to the pressure of fluid at a less restricted portion of the conduit.

6. In a fluid system, in combination a fluid storage reservoir, a fluid flow register and a valve serially disposed and joined to transmit fluid therethrough from a source of fluid at relatively high pressure to a fluid consuming point means biasing said valve to closed position and said valve being responsive to a predetermined difference of pressure on its two sides to start and stop the flow through the register, Venturi-like formed walls through which the flow through the valve passes, and means responsive to the reduction of fluid pressure of fluid flowing through the valve effected by the said Venturi-like walls to effect the exertion of an opening effort upon the valve in excess of and opposing its tendency to close, to hold it continuously in its opened position so long as a predetermined rate of flow is exceeded and to permit the valve to close at any lower rate.

7. In a fluid system in combination a fluid storage reservoir, a fluid flow register and a valve serially disposed and joined to transmit fluid therethrough from a source of fluid at relatively high pressure to a fluid consuming point means biasing said valve to closed position and said valve being subjected to pressure on two sides, responsive to a predetermined difference of said pressure to start and stop the flow through the register, Venturi-like formed walls through which the flow through the valve passes, and means responsive to the reduction of fluid pressure of fluid flowing through the valve effected by said Venturi-like walls to effect the exertion of an opening effort upon the valve in excess of and opposing its tendency to close, to hold it continuously in its opened position so long as a predetermined rate of flow is exceeded and to permit the valve to close at any lower rate, said last named means, comprising a conduit for communicating the throat pressure of the Venturi-like restriction to one side of the valve, the opposing side of the valve being exposed to a pressure greater according to the rate of flow through the valve.

8. In a fluid system in combination a fluid storage reservoir, a fluid flow register and a valve serially disposed and joined to transmit fluid therethrough from a source of fluid at relatively high pressure to a fluid consuming point means biasing said valve toward closed position and said valve being movable responsive to a predetermined difference of pressure on its two sides to start and stop the flow through the register, and a Venturi-like formed conduit through which the flow through the valve passes, and means responsive to the reduction of fluid pressure of fluid flowing through the valve effected by said Venturi-like conduit to effect the exertion of an opening effort upon the valve in excess of and opposing its tendency to close, to hold it continuously in its opened position so long as a predetermined rate of flow is exceeded and to permit the valve to close at any lower rate, and a by-pass for the Venturi-like formed conduit, and valve means adapted to variably restrict the flow through the by-pass increasingly at decreased rates of flow.

9. A meter mechanism comprising a storage chamber adapted to receive a supply of liquid from a source of liquid under pressure and to retain it under pressure derived from said source for supplying drafts of liquid at varying rates, a valve to effect discontinuance of flow from the source to the storage chamber, said valve being freely movable and responsive to a sufficient difference of pressure on its two sides resulting from a predetermined depletion of fluid and consequent loss of pressure in the storage chamber to effect its movement in a direction corresponding to the direction of flow through the valve to an opened position to permit a replenishing flow at a relatively high rate to the storage chamber, and a registering mechanism operated by the passage of the replenishing flow.

10. In a fluid conduit system, a source of fluid supply, means forming a fluid passage, the passage having a valve opening, a valve element disposed to move to open and close the valve opening, a portion of the passage comprising a chamber disposed on the discharge side of the valve opening, a portion of the walls of the chamber closely fitting the valve element for a predetermined extent in the direction of movement of the valve element from its closed position, the said valve element presenting a greater area to the pressure of fluid disposed on its approach side when the valve is in open position than when it is in closed position, a fluid supplied system adapted to be supplied by fluid flowing through the valve opening, a reservoir associated with the supplied system on the discharge side of the valve opening, and adapted to supply fluid at small drafts to the supplied system, and the fluid flowing through the valve opening to the reservoir to fill it and to the supplied system at relative great rates acting on the said greater area of the valve element to tend to hold it open at velocity of the fluid above a predetermined value.

11. In a fluid system in combination, means forming a passage having a valve opening, a valve element disposed to move to open and close the valve opening, a portion of the passage comprising a chamber disposed on the discharge side of the valve opening, a portion of the walls of the chamber closely fitting the valve element for a predetermined extent in the direction of movement of the valve element from its closed position, said element presenting a greater area to the pressure of fluid disposed on its approach side when the valve is in opened position than when it is in closed position, a fluid storage chamber connected to the discharge side of the valve, a fluid pressure responsive element comprising a movable wall of the storage chamber, means to communicate the pressure of fluid in the conduit at the discharge side of the valve to a side of the wall so disposed as to tend to move responsive thereto to decrease the fluid capacity of the storage chamber, counter-balancing means constantly exerting pressure effective to tend to move the wall in an opposite direction to increase the capacity in the storage chamber with a force opposing and fractional to the force exerted thereon by the communicated pressure of fluid, and conduit means communicating with the storage chamber adapted to withdraw fluid from the storage chamber at varying rates.

12. In a fluid conduit system a fluid flow controlling valve seated against the direction of flow controlled thereby, conduit means communicating to the valve the pressure of fluid at the approach side of the valve to exert an effort tending to unseat it, conduit means communicating to the valve the pressure of fluid at its discharge side and discharged through the valve, to exert an effort tending to seat it, means operative responsive to the rate of fluid flow through the valve to effect a reduction of the said fluid pressure tending to seat the valve, and means to bias the valve toward closed position by force sufficient to counterbalance a predetermined excess of the said valve opening fluid pressure over the said valve seating fluid pressure.

13. In a valve controlling mechanism, the combination with the valve and its seat of duct means to introduce fluid from a source of fluid under pressure to an approach side of the valve, duct means to communicate fluid passing the valve to a dispensing system and to the valve on a discharge side thereof, said valve movable by fluid pressures exerted opposingly on its approach and discharge sides, and means biasing said valve so as to tend to maintain it on its seat, said valve being so disposed as to move against the direction of flow controlled thereby when moving toward its seat, and means responsive to the rate of flow past the valve for reducing the pressure on the discharge of the valve below that at the time existing in the system immediately adjacent to the valve seat to tend to keep the valve in its opened position after a preliminary opening movement.

14. In a fluid system, a valve therefor, a seat for the valve, a restriction in the line of flow controlled by the valve, said valve positioned for movement in the direction of flow to opened position and subjected to fluid pressure exerted on its two sides, means biasing the valve toward closed position against the direction of flow, independently of said fluid pressures and means associated with said valve comprising a fluid compartment, and a movable wall therefor, said wall being adapted to move to exert an unseating effort upon the valve upon a reduction of pressure on its one side from that on its other side, said one side communicating with said restriction.

15. In a valve controlling mechanism, the combination with the valve and its seat of duct means to introduce fluid from a source of fluid under pressure to an approach side of the valve, duct means to communicate fluid passing the valve to a dispensing system and to the valve on a discharge side thereof, said valve movable by fluid pressures exerted opposingly on its approach and discharge sides and means biasing said valve so as to tend to maintain it on its seat, said valve being so disposed as to move against the direction of flow controlled thereby when moving toward its seat, and means responsive to the predetermined rate of flow past the valve for reducing the pressure on the discharge side of the valve below that at the time existing in the system immediately adjacent to the valve seat to tend to keep the valve in its opened position after a preliminary opening movement responsive to the predetermined rate of flow past the valve, and a resiliently expansible fluid chamber connected to the said discharge conduit for storing fluid under pressure prior to reseating of the valve after an opening movement thereof.

16. In a fluid conduit system, connections and apparatus for opening and holding open a fluid system valve, normally biased toward closure, by fluid pressure force at all rates of flow above a given rate of flow therethrough, and for closing said valve at any lower rate of flow, conduit means for fluid discharge through the valve, a restriction in the conduit means, a fluid connection whereby the fluid pressure on the approach side of said valve may be applied to the valve to tend to open it and hold it open and a connection between the restriction and another portion of the valve whereby reduced pressure affected by the restriction may be applied to the valve in opposition to the first-named pressure.

17. In a fluid conduit system, a fluid system valve normally biased toward closure, connections and apparatus for opening and holding open the valve by fluid pressure force at all rates of flow above a given rate of flow therethrough, and for closing said valve at any lower rate of flow comprising means forming a passageway for fluid discharged through the valve, a restriction in the passageway, a fluid connection whereby the fluid pressure on the approach side of said valve may be applied to the valve to tend to open it and hold it open, and a connection between the restriction and another portion of the valve whereby reduced pressure effected by the restricion may be applied to the valve in opposition to the first-named pressure.

18. In a fluid conduit system, a fluid system valve normally biased toward closure, connections and apparatus for opening and holding open the valve by fluid pressure force at all rates of flow above a given rate of flow therethrough, and for closing said valve at any lower rate of flow, comprising means forming a passageway for fluid discharged through the valve, a restriction in the passageway, a chamber having a wall movable responsive to pressure in the chamber, the valve being adapted to be moved toward closed position by movement of the wall in one direction, a fluid connection whereby the fluid pressure on the approach side of said valve may be applied to the valve to tend to open it and hold it open, and a connection between the restriction and the chamber whereby reduced pressure effected by flow through the restriction may be communicated to the chamber to tend to move the valve toward closed position in opposition to the opening pressure thereon.

19. In a fluid conduit system, a fluid system valve normally biased toward closure, connections and apparatus for opening and holding open the valve by fluid pressure force at all rates of flow above a given rate of flow therethrough, and for closing said valve at any lower rate of flow, comprising means forming a passageway for fluid discharged through the valve, a restriction in the passageway, a pressure chamber, a movable valve element having a close fitting portion reciprocable in the chamber and providing a movable wall thereof, a fluid connection whereby the fluid pressure on the approach side of said valve may be applied to the valve to open it and hold it open, and a connection between the restriction and the chamber whereby reduced pressure effected by flow through the restriction may be communicated to the chamber to tend to move the valve toward closed position in opposition to the opening pressure thereon.

20. In a fluid conduit system, a fluid system valve normally biased toward closure connections and apparatus for opening and holding open the valve by a fluid pressure force at all rates of flow above a given rate of flow therethrough, and for closing said valve at any lower rate of flow, comprising a movable valve element, a chamber having a wall movable responsive to pressure in the chamber, the valve element being adapted to be moved toward valve closed position by movement of the wall in one direction, a fluid connection whereby the fluid pressure on the approach side of the valve element may be applied thereto to tend to open it and hold it open, means for forming a passageway for fluid discharged through the valve opening, a restriction in the passageway adjacent the valve opening, and the passageway having a communication with the chamber through the valve element whereby reduced pressure effected by flow through the restriction may be communicated to the chamber to tend to move the valve toward closed position in opposition to the opening pressure thereon.

21. In a fluid conduit system, a fluid system valve normally biased toward closure connections and apparatus for opening and holding open the valve by fluid pressure force at all rates of flow above a given rate of flow therethrough, and for closing said valve at any lower rate of flow, comprising a pressure chamber, a movable valve element having a close fitting portion reciprocable in the chamber and providing a movable wall thereof, a fluid connection whereby the fluid pressure on the approach side of the valve may be applied to the valve element to tend to move it to and hold it in open position, means forming a passageway for fluid discharged through the valve opening, a restriction in the passageway adjacent the valve element, a communicating conduit extending through the valve element from the restriction to the chamber, whereby reduced pressure effected by flow through the restriction may be communicated to the chamber to tend to move the valve toward closed position in opposition to the opening pressure thereon.

22. A meter mechanism comprising a storage chamber adapted to receive a supply of liquid from a source of liquid under pressure and to retain it under pressure from said source for supplying drafts of liquid at varying rates, a valve to effect discontinuance of flow from the source to the storage chamber, said valve being movable and responsive to a sufficient difference of pressure on its two sides resulting from a predetermined depletion of fluid and consequent loss of pressure in the storage chamber, to effect its movement to an open position to permit a replenishing flow at a relatively high rate to the storage chamber, means associated with said valve responsive to the rate of flow therethrough after the valve is opened to maintain the valve in an open position until the storage chamber has been so replenished as to cause the pressures on the two sides of the valve to be much less different than the above recited required difference to open the valve, and a registering mechanism operated by the passage of the replenishing flow.

23. In a metering mechanism for measuring the amount of fluid supplied to a conduit system and obtained from a source of fluid under relatively high pressure, a fluid reservoir, means for supplying the demand of the conduit system for fluid from the reservoir, means for recharging the reservoir and for supplying the conduit system directly from the source whenever the pressure of fluid in the reservoir is reduced below that of the fluid at the source by a predetermined amount of pressure, means responsive to the rate of flow for maintaining continuance of the recharging operation and supply from the source for such a period as the rate of flow exceeds a predetermined rate and means for registering only the recharging and directly supplied fluid.

24. A passageway for fluid flow, a fluid register in said passageway, a valve in said passageway, means operated by the difference of pressure across said passageway to open said valve if a predetermined amount of difference of pressure is exceeded, fluid pressure operated means and means associated therewith dominated by the rate of flow through said passageway to hold said valve open as long as a predetermined rate of said flow is exceeded, said valve movable in the direction of the flow therethrough when moving toward open position.

25. In a fluid conduit system, a fluid flow controlling valve opening in the direction of flow controlled thereby, conduit means communicating to the valve the pressure of fluid at the approach side of the valve to exert an effort tending to unseat the valve, conduit means communicating to the valve the pressure of fluid at its discharge side to exert an effort tending to seat it, means biasing the valve toward its seated position, the valve being adapted to be opened by an excess of approach pressure above discharge pressure greater than a predetermined amount and means responsive to the rate of flow through the open valve to effect a reduction of pressure in the conduit means communicating pressure to the valve in the seating direction, and the biasing means exerting sufficient force to counterbalance a predetermined excess of the said valve opening pressure over the said valve seating pressure.

26. In a fluid system, in combination a storage chamber, for containing fluid, a fluid consuming system communicating therewith, said chamber adapted to supply fluid upon demand to the consuming system, a source of supply of fluid under pressure, a conduit to communicate replenishing flows of fluid from the source to the chamber, a meter and a valve, said meter adapted to register the amount of replenishing fluid so supplied to the chamber, said valve positively moved to open position by the effect of a predetermined excess of static pressure on its side toward the source, over that existing on its discharge side, and means responsive to the velocity effects of fluid passing through the valve and acting directly thereon to effect a holding of the valve open to continuance of the flow therethrough so long as a given velocity is exceeded, independently of the relative static forces effective on its approach and discharge sides.

27. In a fluid system in combination a fluid storage reservoir, a fluid register and a valve connected together to transmit fluid from a source of fluid at relatively high pressure to a fluid consuming point, said valve being movable to close in a direction counter to the direction of flow and directly responsive to a predetermined difference of pressure exerted upon its two sides to start and stop the flow through the register, means responsive to the rate of flow through the valve to effect the exertion of pressure effort upon the valve in excess of and opposing its tendency to close, and to effect a holding of the valve continuously in its opened position so long as a predetermined rate of flow is exceeded and biasing means opposing the effect of said rate of flow responsive means by a predetermined pressure valve, said biasing means effecting closure of the valve against the direction of the flow upon reduction of the pressure effort effected by said rate of flow responsive means below a predetermined value when the flow is reduced to a predetermined lower rate.

28. In a fluid system a reservoir adapted to supply small drafts of flow at variable rates including low rates of flow, a valve, and a source of fluid at relatively high pressure adapted when the valve is opened to replenish the reservoir at only a rapid rate of flow, fluid flow registering mechanism adapted to be operated by the replenishing flow, said reservoir having a pressure actuated wall reciprocable in a direction to force fluid therefrom upon demands therefor, and reciprocable in an opposite direction responsive to the greater pressure of fluid from the source when the valve is opened to permit storing of fluid in the reservoir during replenishing valve-opening periods, said reservoir comprising a counter-pressure means of inherent resiliency under compression, acting against said wall tending to move it in a direction to put the fluid in the reservoir under the reactive force effected by said counter-pressure means and means comprising a movable fluid division element adapted to communicate motion to said valve, a substantially Venturi restriction in a line of flow through said valve, and a duct communicating the pressure effects existing at the throat of the said venturi to a side of said division element to maintain the valve in opened position so long as a predetermined rate of flow through said venturi is exceeded.

29. In a fluid system, in combination a fluid storage reservoir, a fluid flow register and a valve connected together to transmit fluid from a source of fluid at relatively high pressure to a fluid consuming point, means biasing said valve to closed position and said valve being responsive to a predetermined difference of pressure on its two sides to start and stop the flow through the register, Venturi-like formed walls through which the flow through the valve passes, and means responsive to the reduction of fluid pressure of fluid flowing through the valve effected by the said Venturi-like walls to effect the exertion of an opening effort upon the valve in excess of and opposing its tendency to close, to hold it continuously in its opened position so long as a predetermined rate of flow is exceeded and to permit the valve to close at any lower rate.

30. In a fluid system in combination a fluid storage reservoir, a fluid flow register and a valve, connected together to transmit fluid from a source of fluid at relatively high pressure to a fluid consuming point means biasing said valve to closed position and said valve being subjected to pressure on two sides, responsive to a predetermined difference of said pressures to start and stop the flow through the register, Venturi-like formed walls through which the flow through the valve passes, and means responsive to the reduction of fluid pressure of fluid flowing through the valve effected by said Venturi-like walls to effect the exertion of an opening effort upon the valve in excess of and opposing its tendency to close, to hold it continuously in its opened position so long as a predetermined rate of flow is exceeded and to permit the valve to close at any lower rate, said last named means, comprising a conduit for communicating the throat pressure of the Venturi-like restriction to one side of the valve, the opposing side of the valve being exposed to a pressure greater according to the rate of flow through the valve.

In testimony whereof I hereunto affix my signature this 1st day of December, 1923.

GEORGE GOODELL EARL.